United States Patent
Moore et al.

(10) Patent No.: US 11,577,396 B1
(45) Date of Patent: Feb. 14, 2023

(54) VISUAL ANNOTATIONS IN ROBOT CONTROL INTERFACES

(71) Applicant: X Development LLC, Mountain View, CA (US)

(72) Inventors: Kyle Moore, Woodside, CA (US); Vincent Dureau, San Francisco, CA (US); Nareshkumar Rajkumar, Cupertino, CA (US)

(73) Assignee: X DEVELOPMENT LLC, Mountain View, CA (US)

(*) Notice: Subject to any disclaimer, the term of this patent is extended or adjusted under 35 U.S.C. 154(b) by 167 days.

(21) Appl. No.: 16/929,874

(22) Filed: Jul. 15, 2020

Related U.S. Application Data

(63) Continuation of application No. 15/864,870, filed on Jan. 8, 2018, now Pat. No. 10,737,389, which is a continuation of application No. 14/831,549, filed on Aug. 20, 2015, now Pat. No. 9,895,809.

(51) Int. Cl.
  *B25J 9/16* (2006.01)
  *B25J 13/06* (2006.01)
  *B25J 11/00* (2006.01)
  *B25J 13/00* (2006.01)

(52) U.S. Cl.
  CPC ......... *B25J 9/1689* (2013.01); *B25J 11/0005* (2013.01); *B25J 13/006* (2013.01); *B25J 13/06* (2013.01)

(58) Field of Classification Search
  CPC .... B25J 9/1689; B25J 11/0005; B25J 13/006; B25J 13/06; B25J 9/1697
  See application file for complete search history.

(56) References Cited

U.S. PATENT DOCUMENTS

| | | | |
|---|---|---|---|
| 7,941,753 B2 | 5/2011 | Meisels et al. | |
| 8,718,837 B2 | 5/2014 | Wang et al. | |
| 8,902,278 B2 | 12/2014 | Pinter et al. | |
| 9,796,091 B1* | 10/2017 | Soo | G06Q 10/1095 |
| 9,821,455 B1* | 11/2017 | Bareddy | H04N 7/15 |
| 10,207,411 B2 | 2/2019 | Michalakis | |

(Continued)

FOREIGN PATENT DOCUMENTS

| | | |
|---|---|---|
| WO | 2011146254 | 11/2011 |
| WO | 2013176762 | 11/2013 |

*Primary Examiner* — Robert T Nguyen
(74) *Attorney, Agent, or Firm* — Gray Ice Higdon

(57) ABSTRACT

Methods, apparatus, systems, and computer-readable media are provided for visually annotating rendered multi-dimensional representations of robot environments. In various implementations, an entity may be identified that is present with a telepresence robot in an environment. A measure of potential interest of a user in the entity may be calculated based on a record of one or more interactions between the user and one or more computing devices. In some implementations, the one or more interactions may be for purposes other than directly operating the telepresence robot. In various implementations, a multi-dimensional representation of the environment may be rendered as part of a graphical user interface operable by the user to control the telepresence robot. In various implementations, a visual annotation may be selectively rendered within the multi-dimensional representation of the environment in association with the entity based on the measure of potential interest.

20 Claims, 9 Drawing Sheets

(56) References Cited

U.S. PATENT DOCUMENTS

| | | |
|---|---|---|
| 2011/0288667 A1 | 11/2011 | Noda et al. |
| 2012/0197439 A1 | 8/2012 | Wang et al. |
| 2013/0325244 A1* | 12/2013 | Wang .................. G05D 1/0011 701/26 |
| 2014/0086395 A1* | 3/2014 | Redfern ................ G06F 16/683 704/E11.001 |
| 2014/0363056 A1* | 12/2014 | Nakagomi ............. G06V 10/40 382/115 |
| 2015/0331560 A1 | 11/2015 | Song et al. |
| 2016/0026272 A1 | 1/2016 | Park et al. |
| 2016/0155094 A1 | 6/2016 | Rentsch |
| 2016/0184990 A1 | 6/2016 | Song et al. |
| 2022/0139510 A1* | 5/2022 | Romanychev .......... G06F 21/36 705/2 |
| 2022/0141025 A1* | 5/2022 | Bogineni .............. H04L 9/3255 713/156 |

* cited by examiner

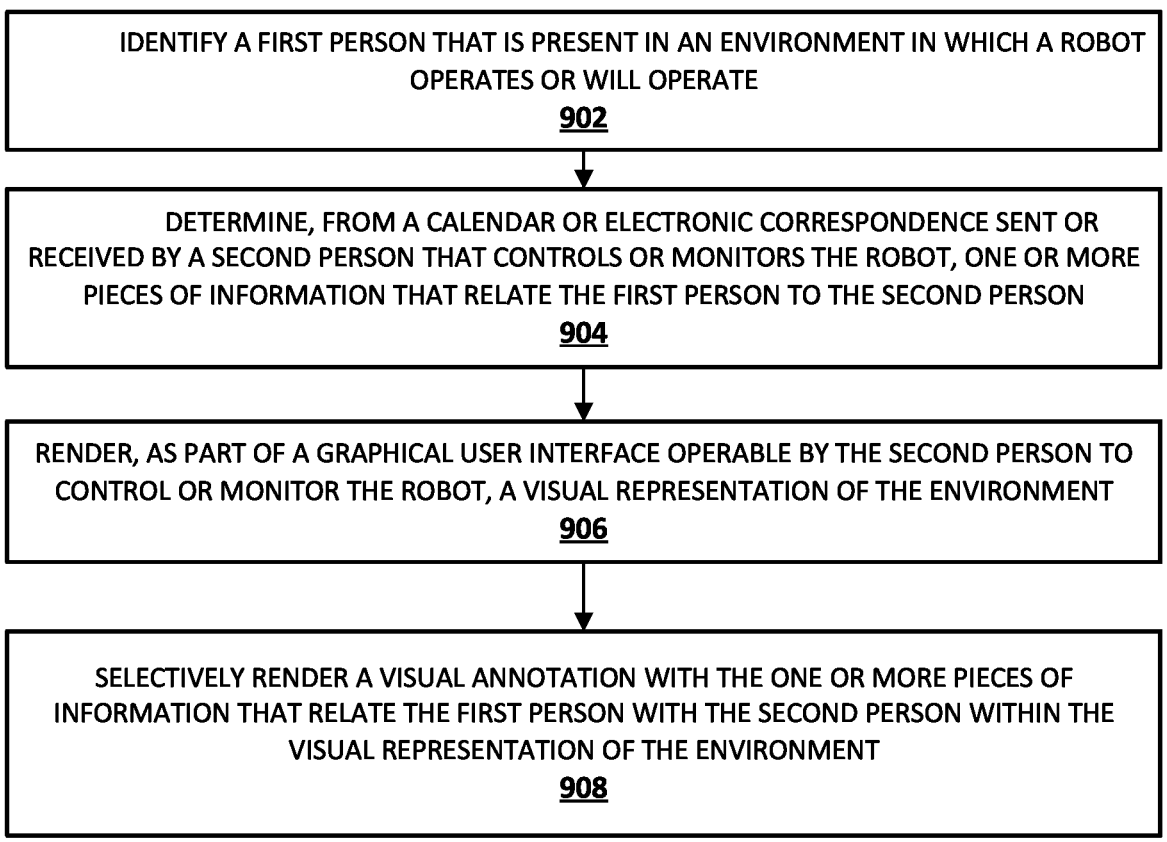

VISUAL ANNOTATIONS IN ROBOT CONTROL INTERFACES

BACKGROUND

Many robots may be remotely controlled to various degrees by a user operating a computing device to issue commands to the robot. In some instances, the user may send the robot to be present at a location and/or take various actions on the user's behalf. Robots designed specifically for this purpose are often referred to as "telepresence" robots. A graphical user interface that is operable to remotely control a robot such as a telepresence robot often may depict the robot's current environment in real time, e.g., using a video feed provided by the robot itself or using a map view generated based on a determination of the robot's present coordinates.

SUMMARY

The present disclosure is generally directed to methods, apparatus, and computer-readable media (transitory and non-transitory) for selectively rendering, in graphical user interfaces operable to remotely control robots such as telepresence robots, visual annotations pertaining to various entities (e.g., persons, objects, etc.) located in environments with the robots. In various implementations, visual annotations may be selectively rendered in a graphical user interface operated by a user remotely controlling a robot based at least in part on a record of interactions between the user and one or more computing devices. The interactions may or may not be for purposes of directly controlling the robot, and may in some instances be indicative of the controlling user's context.

In some implementations, a computer implemented method may be provided that includes the steps of: identifying, by one or more processors, an entity that is present with a telepresence robot in an environment; calculating, by the one or more processors, based on a record of one or more interactions between a user and one or more computing devices, a measure of potential interest of the user in the entity, wherein the one or more interactions are for purposes other than directly operating the telepresence robot; rendering, by the one or more processors, as part of a graphical user interface operable by the user to control the telepresence robot, a multi-dimensional representation of the environment; and selectively rendering, by the one or more processors, based on the measure of potential interest, a visual annotation associated with the entity within the multi-dimensional representation of the environment.

This method and other implementations of technology disclosed herein may each optionally include one or more of the following features.

In some implementations, selectively rendering may include rendering the visual annotation with a visual attribute that is selected based on the measure of potential interest. In some implementations, the entity may be a person or an object. In some implementations, identifying the entity may include identifying a person using facial recognition based on a signal provided by the telepresence robot. In some implementations, identifying the entity may include identifying a person based on detection, by the telepresence robot, of a communication mechanism carried by the person. In some implementations, identifying the entity may include identifying a person based at least in part on the record of one or more interactions between the user and the one or more computing devices.

In various implementations, the multi-dimensional representation of the environment may include a live video feed provided by the robot, and wherein rendering the visual annotation comprises overlaying the visual annotation on the live video feed. In various implementations, the multi-dimensional representation of the environment may include a live map view of the environment, and wherein rendering the visual annotation comprises overlaying the visual annotation on the live map view.

In various implementations, the record of one or more interactions between the user and one or more computing devices may include a one or more content items created, received, or otherwise consumed by the user using the one or more computing devices. In various implementations, the record of one or more interactions between the user and one or more computing devices may include a calendar maintained by the user using the one or more computing devices. In various implementations, the record of one or more interactions between the user and one or more computing devices may include information associated with social network activity of the user.

Other implementations may include a non-transitory computer readable storage medium storing instructions executable by a processor to perform a method such as one or more of the methods described above. Yet another implementation may include a control system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 9 depicts another example method for practicing selected aspect of the present disclosure, in accordance with various implementations.

DETAILED DESCRIPTION

Figure 1:
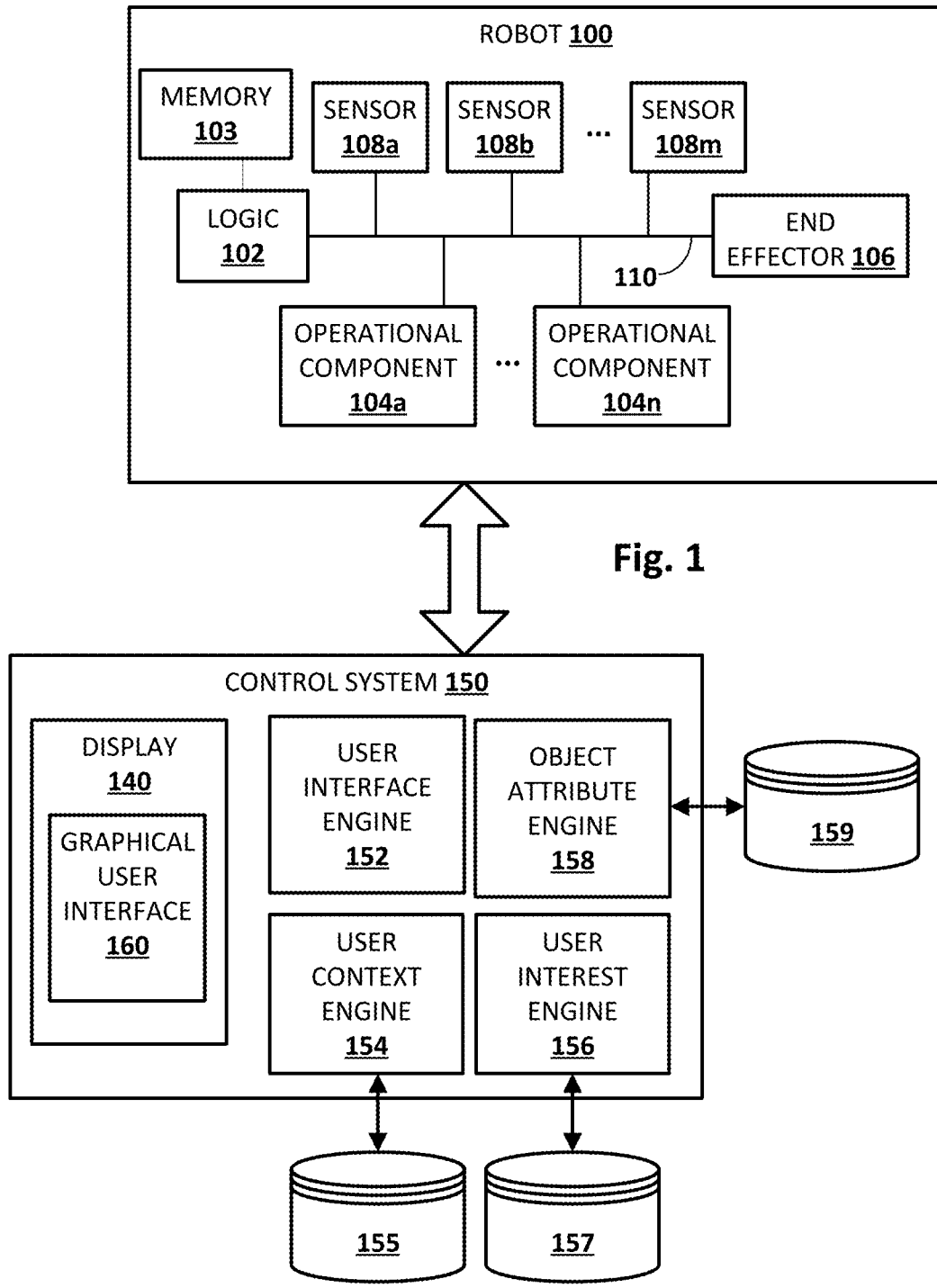
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A robot 100 may be in communication with a control system 150. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, a unmanned aerial vehicle ("UAV"), and so forth. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 103. Memory 103 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more operational components 104a-n, one or more end effectors 106, and/or one or more sensors 108a-m, e.g., via one or more buses 110. As used herein, "operational components" 104 of a robot may refer to actuators, motors (e.g., servo motors), joints, shafts, gear trains, pumps (e.g., air or liquid), pistons, drives, or other components that may create and/or undergo propulsion, rotation, and/or motion. Some operational components such as many joints may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances. Some robots, such as some telepresence robots, may not be equipped with end effectors. Instead, some telepresence robots may include displays to render representations of the users controlling the telepresence robots, as well as speakers and/or microphones that facilitate the telepresence robot "acting" like the user.

Sensors 108 may take various forms, including but not limited to cameras, light sensors (e.g., passive infrared), force sensors, pressure sensors, pressure wave sensors (e.g., microphones), proximity sensors (also referred to as "distance sensors"), depth sensors, torque sensors, bar code readers, radio frequency identification ("RFID") readers, radars, range finders, accelerometers, gyroscopes, compasses, position coordinate sensors (e.g., global positioning system, or "GPS"), speedometers, edge detectors, and so forth. While sensors 108a-m are depicted as being integral with robot 100, this is not meant to be limiting. In some implementations, sensors 108 may be located external to, but may be in direct or indirect communication with, robot 100, e.g., as standalone units or as part of control system 150.

Control system 150 may include one or computing systems connected by one or more networks (not depicted) that control operation of robot 100 to various degrees. An example of such a computing system is depicted schematically in FIG. 7. In some implementations, control system 150 may be operated by a user (not depicted) to exert a relatively high level of control over robot 100, e.g., in real time in response to signals received by a user interface engine 152 and/or one or more readings from one or more sensors 108. In other implementations, control system 150 exerts less direct control over robot 100. For example, control system 150 may provide robot 100 with a high level task such as "go to location, identify person, follow person." Logic 102 on robot 100 may convert such high level tasks into robot action, e.g., by translating one or more high level tasks into a plurality of motion primitives executable by robot 100. In some implementations, control system 150 may include a display 140 (e.g., CRT, LCD, touchscreen, etc.) on which a graphical user interface 160 operable to remotely control robot 100 may be rendered.

Various modules or engines may be implemented as part of control system 150 as software, hardware, or any combination of the two. For example, in FIG. 1, control system 150 includes a user interface engine 152, a user context engine 154, a user interest engine 156, and an object attribute engine 158. User interface engine 152 may be configured to enable user input of various commands or tasks for robot 100, and/or output of various data, e.g., to facilitate remote control of robot 100 and rendition of visual annotations on display 140 as described herein. In some implementations, user interface engine 152 may provide data usable by a computing device (e.g., laptop, smart phone, workstation, desktop, tablet, etc.) to render the graphical user interfaces and/or dialogs presented in FIGS. 2-5. For example, user interface engine 152 may be configured to obtain, e.g., from robot 100, one or more signals from one or more sensors 108 of robot 100, and may render, as part of graphical user interface 160 on display 140, a multi-dimensional representation of an environment in which the robot 100 currently operates.

Suppose robot 100 is a telepresence robot. In such case, one or more sensors 108 may be cameras, each which may provide a live video feed. User interface engine 152 may tap into such video feeds to display the feeds as part of graphical user interface 160. That way, a user is able to "see" what robot 100 sees. In some implementations, such a view may be rendered in three dimensions, e.g., for viewing through 3D goggles or using other virtual reality device. Other "sensations" that may be experienced by robot 100, such as pressure, may also be presented to a user, e.g., using haptic feedback. For example, if robot 100 collides with an obstacle, a haptic component (not depicted) of control system 150 may cause it to shake.

Additionally or alternatively, one or more sensors 108 may be configured to provide position coordinates of robot 100 in real time (e.g., using GPS, Wi-Fi triangulation, etc.). User interface engine 152 may use a signal from such a coordinate sensor 108 to track a location of robot 100 in an environment and generate, e.g., in graphical user interface 160, a map/bird's eye view of robot 100 in the environment. User interface engine 152 may also be configured to selectively render, based on data it receives from user context engine 154 and/or user interest engine 156, one or more visual annotations over one or more of these views (e.g., creating "augmented reality" in a video feed) associated with various other entities located within the environment.

User context engine 154 may be configured to create, maintain, and/or access one or more records of interactions between users and computing devices. In some implementations, the records may be stored in an index 155. A user may have a variety of different interactions with computing devices that effectively define at least part of a "context" of the user. For example, one or more content items, or "user content," created, received, and/or otherwise consumed by a user may be analyzed to identify aspects of the user's schedule, entities with which the user is familiar, a location of the user's desk/cubicle, a location of the user's team, and so forth. The user additionally or alternatively may maintain one or more electronic calendars which may provide additional contextual data about a user (e.g., the user is scheduled to be at location X at time Y with one or more other persons). Additionally or alternatively, the user may maintain (e.g., in association with the user's calendar or separately) reminders, tasks, notes, contacts, and so forth. Additionally or alternatively, the user's activity on one or more social networks may be tracked by user context engine 154.

User interest engine 156 may be configured to calculate, e.g., based on one or more interactions between a user and one or more computing devices obtained from user context engine 154, a measure of potential interest of the user in various entities that are encountered by robot 100 while under the user's control. For example, suppose robot 100 enters a room in which a person is standing. User interest engine 156 may determine, e.g., based on the person's identity and/or various aspects of the user's context provided by user context engine 154, a measure of potential interest the user is likely to have in the person. User interest engine 156 may, for instance, analyze user content such as content items (e.g., documents) created by the user, received by the user, or other content items in which the user has otherwise indicated interest (e.g., content the user has consumed), to determine that the person standing in the room is, at best, an acquaintance of the user, and may provide measure of potential interest (e.g., a score) that is relatively low. Additionally or alternatively, user interest engine 156 may analyze a history of face-to-face meetings and/or video conferences in which the user has participated to determine the user's interest in the person standing in the room. If, for instance, it is determined from such sources that the person standing in the room is the user's boss, then user interest engine 156 may calculate a relatively high measure of potential interest by the user. If robot 100 is following a group of people, then potential user interest in any of the individual people of the group may be relatively high.

As another example, suppose user context engine 154 determines that a user is scheduled to meet with a friend, "Sally," at a public location at a particular time. Suppose further that the user sends robot 100 to the location in the user's place. There may be a variety of people at or near the public location. User interest engine 156 may calculate relatively low measures of potential user interest for the majority of these people, e.g., because they are unidentifiable and/or are never mentioned in user content of the user, in the user's calendar, or in the user's social network activities. However, user interest engine 156 may calculate a much higher measure of potential interest for Sally, assuming robot 100 is able to identify Sally at the location.

Object attribute engine 158 may be configured to store, e.g., in index 159, records of various objects that may be acted upon by robot 100. For example, object attribute engine 158 may store in index 159 a record, "cup," along with data about how robot 100 should act upon cup (e.g., do not tip the cup over if full). As another example, object attribute engine 158 may store in index 159 a record "door" along with data about how robot 100 should act upon a door (e.g., open, close). As yet another example, object attribute engine 158 may be configured to store information about one or more objects that form part of an exhibit, e.g., at a science, history, and/or art museum, including but not limited to these objects' history, creator, significance, and so forth. In some implementations, object attribute engine 158 may "learn" about objects over time, e.g., in response to robot interactions with various objects, and create new records (or alter existing records) in index 159. Additionally or alternatively, object attribute engine 158 may be operated by one or more users (e.g., crowdsourced users) to add new records associated with previously unknown objects and/or to supplement records of existing objects.

Based on information provided by user context engine 154, user interest engine 156, and/or object attribute engine 158, user interface engine 152 may be configured to selectively render, within a multi-dimensional representation of an environment in which robot 100 is currently operating that is rendered in graphical user interface 160, one or more visual annotations. For example, in some implementations, the multidimensional representation of the environment may be a live video feed provided by robot 100. In such instances, rendering visual annotations may include overlaying the visual annotations on the live video feed, e.g., in a manner similar to augmented reality. In some implementations, the multidimensional representation of the environment may be a live map view of the environment, e.g., from a bird's eye view. In such instances, rendering the visual annotations may include overlaying the visual annotation on the live map view.

While robot 100 and control system 150 are depicted separately in FIG. 1, this is not meant to be limiting. In various implementations, one or more aspects (e.g., modules, engines, etc.) depicted in FIG. 1 as implemented on one of robot 100 or control system 150 may be implemented on the other, may be distributed across both, and/or may be distributed across one or both in combination with other components not depicted in FIG. 1. In implementations where robot 100 and control system 150 are separate, they may communicate over one or more wired or wireless networks (not depicted) or using other wireless technology, such as radio, Bluetooth, infrared, etc. In other implementations, control system 150 may be implemented entirely or in part using logic 102 of robot 100.

Figure 2:
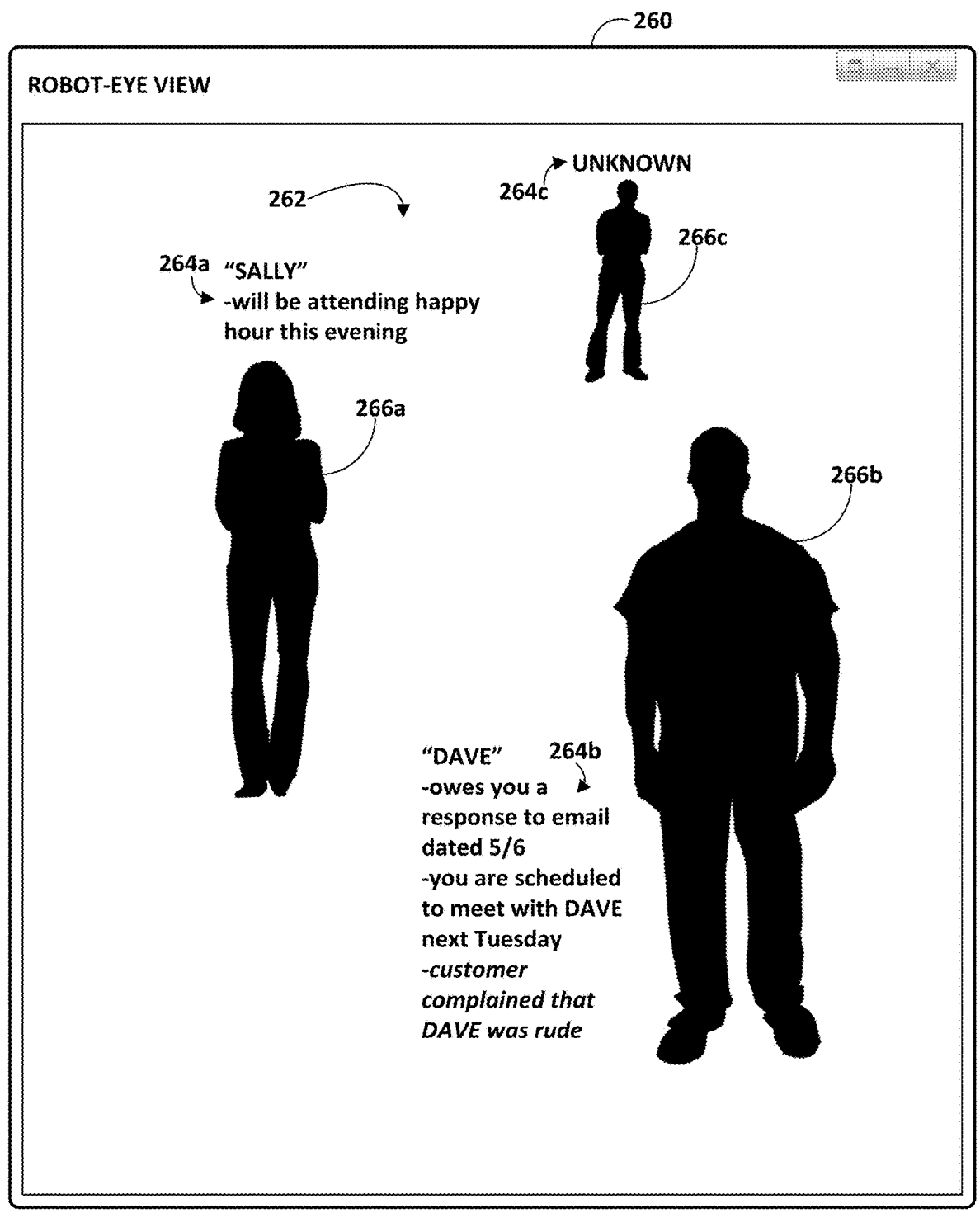
FIG. 2 depicts an example "ROBOT-EYE VIEW" graphical user interface for remotely controlling a robot, in accordance with various implementations.

FIG. 2 depicts an example "ROBOT-EYE VIEW" graphical user interface 260 that may be rendered on display 140 and operated by user that remotely controls a robot (e.g., 100), in accordance with various implementations. Graphical user interface 260 may include a rendered multi-dimensional representation 262 of an environment in which robot 100 operates. In FIG. 2, as well as in FIGS. 4-5, multi-dimensional representation 262 is three-dimensional. However, this is not meant to be limiting. Techniques disclosed herein are equally applicable in rendered environments having other dimensions, such as two dimensions. A series of annotations 264*a-c* are rendered within representation 262 in association with three entities 266*a-c* located in the same environment as robot 100. In particular, robot 100 "sees" (e.g., via its video feed) three entities, first person 266*a*, a second person 266*b*, and a third person 266*c*. Each of these people is annotated with a respective visual annotation 264 that indicates their name, if known, or a designation of "UNKNOWN" if the person is unknown.

Robot 100 may identify entities such as people utilizing various techniques based on various signals from various sensors 108. For example, robot 100 may utilize facial recognition technology to recognize SALLY and DAVE in FIG. 2, but may not recognize the third person 266c. In some implementations, robot 100 may itself perform the facial recognition, e.g., using logic 102. In some implementations, robot 100 may delegate the task of facial recognition to another computing device, which may perform the facial recognition based on a signal provided by robot 100. For example, one or more sensors 108 of robot 100 may collect data (e.g., data points of an encountered person's face) that robot 100 may provide as a signal to a remote computing device (e.g., control system 150). The remote computing device may then compare the data points provided by robot 100 to a database of known faces and provide one or more of the best matches. Other types of recognition may be used in addition to or instead of facial recognition, such as voice recognition.

Additionally or alternatively, robot 100 may identify an entity such as a person at a location based at least in part on data provided by user context engine 154. Suppose a user, Fred, has a meeting scheduled with another user, Ann, in a particular room at a particular time, and that no other attendees are scheduled at the meeting. Suppose further that Fred sends his telepresence robot (e.g., 100) to the room at the appointed time in his stead. Fred's telepresence robot may determine that there is one person in the room. Based on that fact, and on the fact that Fred and Ann are the only two people scheduled to attend the meeting, Fred's telepresence robot may deduce that the person in the room is Ann. In some implementations, Fred's telepresence robot may calculate a confidence of its deduction, e.g., based on past deductions that were successful or unsuccessful. In other similar implementations, it may be determined, e.g., based on a user's calendar entry, that a particular person is likely located in a particular area (i.e., with a high level of granularity). A robot may be dispatched to the area by the user, and then the robot may perform facial recognition or other techniques in order to identify which person in that general area is the particular person mentioned in the user's calendar entry (i.e., a lower granularity).

In some implementations, robot 100 may identify a person nearby based on signals from both sensors 108 and from user context engine 154. In the example above, Fred's telepresence robot may identify a person in the room as being female based on a variety of visual signals, such as clothes worn, height, built, hairstyle, voice, etc., but may not be able to identify her as Sally without further information. However, if Fred was scheduled to have a meeting at that location with Sally and another person who is male, Fred's telepresence robot may deduce that the person that it identified as female must be Sally, e.g., based on Fred's calendar appointment.

Robot 100 may identify entities such as people or objects using other techniques as well. In some implementations, robot 100 may employ object recognition, or may provide signals to a remote computing device (e.g., control system 150) so that the remote computing device may employ object recognition. In some implementations, object recognition may be employed with the assistance of (or even by) object attribute engine 158. In some implementations, robot 100 may identify (or may provide visual signals used by another computing device to identify) entities by employing optical character recognition to read signs, labels, name badges, or other text associated with and/or describing entities.

In some implementations, one or more sensors 108 of robot 100 may be configured to detect wireless signals transmitted by various communication mechanisms that may be associated with entities. Logic 102 may use these signals to identify an entity near robot 100, or may provide data indicative of the signals to a remote computing device (e.g., 150) to perform the identification. For example, one sensor 108 may be an RFID sensor that may receive a signal from an RFID tag associated with an entity. The RFID tag (or "badge") may be worn by a person near robot 100, may be placed on an object near robot 100, may be affixed at or near a museum exhibit to which robot 100 has come into proximity, etc. Other similar types of wireless sensors 108 may utilize other wireless technologies, including but not limited to BlueTooth, Wi-Fi, infrared, and so forth. In some implementations, a computing device such as a smart phone or tablet computer that is carried by a person, or even a badge worn by the user, may include one or more wireless transmitters that emit one or more wireless signals. In various implementations, these signals may be detected by various sensors 108 of robot 100, and used by robot 100 to identify a user operating the computing device.

Various visual annotations may be generated by user interface engine 152 in response to identification of various entities in an environment with robot 100. In FIG. 2, for example, the visual annotations 264a-c include either the name of the entity or an indication "UNKNOWN." However, visual annotations 264 may include additional information that may be generated, for instance, based on the record of one or more user interactions (i.e. user context) stored in index 155. For example, first visual annotation 264a includes an indication that SALLY will be at happy hour this evening, which may have been generated, for instance, based on an entry in Sally's calendar. Similarly, second visual annotation 264b includes an indication that DAVE owes the user that controls robot 100 a response to an email, and an indication that DAVE is scheduled to meet with the user that controls robot 100 in the future (e.g., based on the controlling user's calendar).

One additional annotation pertaining to DAVE indicates (in italics) that a customer complained that DAVE was rude. In various implementations, such an annotation may only be visible to users having authorization. For example, if the user controlling robot 100 is ranked higher than DAVE in an organization, the italicized annotation may appear in graphical user interface 260. However, if the user controlling robot 100 is not authorized to see such data, the italicized annotation may be omitted.

Figure 3:
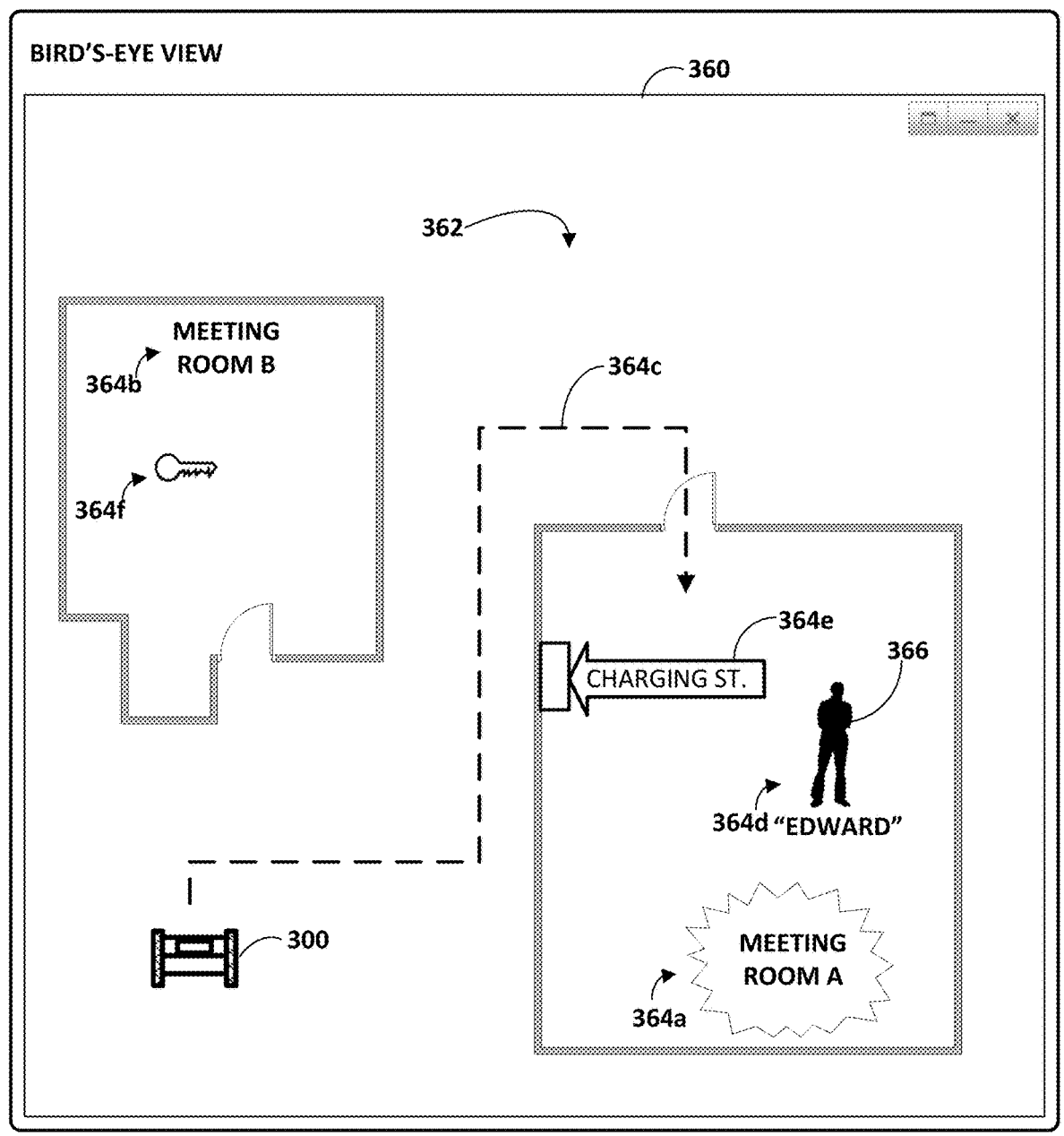
FIG. 3 depicts an example "BIRD'S EYE VIEW" graphical user interface for remotely controlling a robot, in accordance with various implementations.

FIG. 3 depicts an example "BIRD'S-EYE VIEW" (i.e. map view) graphical user interface 360 that a user may operate to remotely control a robot 300, in accordance with various implementations. A two-dimensional representation 362 of an environment in which robot 300 operates is rendered as part of graphical user interface 360. For this example, suppose a controlling user's calendar includes an entry that indicates the user is scheduled to be in MEETING ROOM A at a particular time to meet with a person 366 named Edward. Various annotations 364 have been selectively rendered within representation 362 to aid the user in operating graphical user interface 360 to ensure that robot 300 successfully navigates to MEETING ROOM A at the appropriate time. For example, first and second visual annotations 364a and 364b, respectively, identify MEETING ROOM A and MEETING ROOM B. Because the user is scheduled to be in MEETING ROOM A, in some implementations, annotation 364a may be rendered with a visual attribute selected to make annotation 364a appear more conspicuous than annotation 364b. Such a visual attribute may include but is not limited to more conspicuous colors, larger lettering, animation, various outlining shapes (as is depicted in FIG. 3), and so forth.

A third visual annotation 364c identifies a path that may be taken by robot 300 to MEETING ROOM A. The path represented by third visual annotation 364c may be determined in various ways. In some implementations, robot 300 (or a control system used to control robot 300) may simply calculate the shortest path from a current location of robot 300 to MEETING ROOM A, and may render that path. In some implementations, robot 300 (or a control system used to control robot 300) may analyze a travel history of robot 300 or of other, similar robots, to determine a path most often taken from at or near the current location of robot and MEETING ROOM A. In some implementations, third visual annotation 364c may be rendered at some predetermined time interval prior to the scheduled meeting in MEETING ROOM A, e.g., to notify the user that it is time to start navigating robot 300 towards MEETING ROOM A.

In various implementations, the user that controls robot 300 may have multiple options for traversing robot 300 to MEETING ROOM A. The user may operate her computing device manually control robot 300 to follow third annotation 364c as closely as the user can manage. Or, the user may operate her computing device to instruct robot 300 to automatically travel along the path represented by annotation 364c to MEETING ROOM A, e.g., by clicking or tapping on annotation 364c. In some implementations, any visual annotation or entity with which a visual annotation is associated may be rendered as selectable (e.g., tagged). A user may select the entity or annotation (e.g., with a mouse click or by clicking the entity/annotation on a touch screen) to cause a robot under the user's control to automatically travel to a position adjacent that entity, and/or to cause a path similar to annotation 364c to a position adjacent that entity to be rendered in graphical user interface 360. In addition to the annotations described above, in some implementations, a group of people that is known to be going to MEETING ROOM A (e.g., based on calendar entry or user knowledge) may be annotated. This may facilitate the user operating robot 300 to follow the group so that the user can participate in the "corridor" conversation.

It is not necessary that robot 300 be proximate or in the same environment as an entity in order for the entity to be annotated in a graphical user interface such as 260 or 360. For example, as noted above, the user controlling robot 300 in FIG. 3 has been determined, e.g., from the user's context, to have a meeting scheduled with Edward in MEETING ROOM A. In FIG. 3, robot 300 is not yet proximate or in the same room as Edward, and yet a fourth annotation 364d is rendered that includes the shape of a man and Edward's name. Edward's position may be determined using a variety of signals. For example, a computing device that Edward carries (e.g., a smart phone) or wears (e.g., a smart watch) may provide a signal that indicates to robot 300, or to another computing system in communication with robot 300, Edward's coordinates. Or, MEETING ROOM A may have an RFID scanning device set up at the door that reads Edward's badge as he enters.

In some implementations, resources available within an environment in which robot 300 travels that may be useful to robot 300 and/or to the controlling user may be visually annotated in graphical user interface 360. For example, in FIG. 3, a fifth visual annotation 364e is rendered in MEETING ROOM A. Fifth visual annotation 364e is an arrow that points to a robot charging station ("CHARGING ST." in FIG. 3). This information may be helpful to the controlling user to ensure robot 300 remains charged. For example, once robot 300 is in MEETING ROOM A, the user could maneuver robot 300 to the robot charging station, so that robot 300 may receive power while the user meets with Edward.

In some implementations, a user may request that specific entities be visually annotated, either when approached by a robot (e.g., as in FIGS. 2, 4, and 5) or generally. For example, suppose the controlling user in FIG. 3 left his or her keys at work. Suppose further that the keys are equipped with some type of communication mechanism (e.g., a Bluetooth transmitter, RFID, etc.). The user may operate graphical user interface 360 to indicate that the user wishes to use robot 300 to locate and/or retrieve the user's keys. In response, a sixth visual annotation 364f is rendered that corresponds to a location of the user's keys in MEETING ROOM B. In some implementations, sixth visual annotation 364f may be rendered when robot 300 enters or passes near MEETING ROOM B (e.g., on the way to MEETING ROOM A) and senses a signal transmitted by the keys. In other implementations, sixth visual annotation 364f may be rendered without robot 300 having to come near the keys, e.g., if the communication mechanism associated with the keys transmits a signal strong enough to be sensed by other computing devices in the environment. If a "ROBOT'S EYE VIEW" such as seen in FIG. 2 (e.g., from a video feed provided by robot 300) were used instead of the map view in FIG. 3 to locate the user's keys, the user's keys may be annotated when robot 300 faces a direction in which the keys lie, even if there are walls or other obstacles in between. In other implementations, instead of the user deliberately operating a user interface to locate an object, a user's potential interest in a particular object may be calculated based on a pattern of usage by the user, and the object selectively annotated based on that calculated interest. For example, if the user typically carries keys, keys could be highlighted when they have been detected in a different location than the user.

Figure 4:
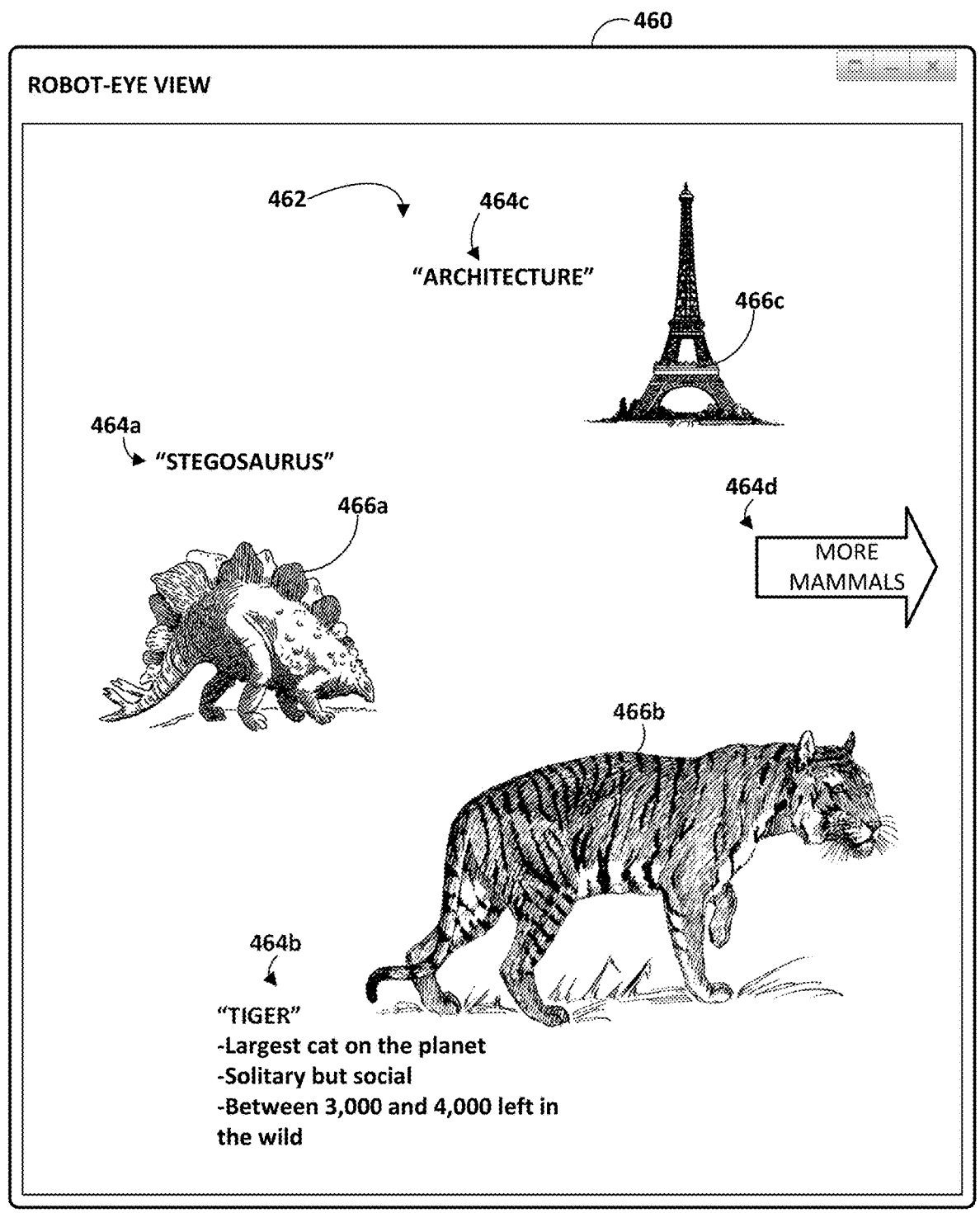
FIG. 4 and FIG. 5 depict two additional example "ROBOT-EYE VIEW" graphical user interfaces for remotely controlling a robot, in accordance with various implementations.

FIG. 4 depicts another "ROBOT-EYE VIEW" graphical user interface 460 that a user may operate to remotely control a robot (not depicted in FIG. 4). In this example, the user may be remotely controlling the robot to travel through a science museum. Depicted in graphical user interface 460 is a representation 462 of a video feed captured by one or more cameras of the robot. The robot current "sees" three entities in the form of three museum exhibits, 466a-466c. First exhibit 466a is a dinosaur, specifically, a stegosaurus. Second exhibit 466b is a tiger. Third exhibit 466c is a building, specifically, the Eiffel Tower.

Various visual annotations 464 may be selectively rendered in graphical user interface 460 in association with entities (in this example, museum exhibits) located proximate to the robot. As described above, these visual annotations may be selected based at least in part on one or more aspects of a controlling user's context. Suppose the user controlling the robot is enrolled in a course that pertains specifically to mammals, and that there is nothing else in the user's context that indicates potential interest in dinosaurs or architecture. The only exhibit in the robot's view that pertains directly to mammals is second exhibit 466b, i.e., the tiger exhibit. The other two exhibits, 466a and 466c, pertain to dinosaurs and architecture, respectively. Second exhibit 466b therefore may be associated with higher measure of potential interest by the controlling user than first exhibit 466a or third exhibit 466c. Thus, a relatively detailed visual annotation 464b is rendered adjacent second exhibit 466b, whereas relatively sparse annotations 464*a* and 464*c* are rendered adjacent first exhibit 466*a* and third exhibit 466*c*.

Additionally or alternatively, in FIG. 4, second exhibit 466*b* may receive a higher measure of potential interest than first exhibit 466*a* or third exhibit 466*c* simply because the robot is closer to second exhibit 466*b*. For example, if the user were to remotely control the robot to move away from second exhibit 466*b* and proximate third exhibit 466*c*, a measure of potential user interest in third exhibit 466*c* may increase, while a measure of potential user interest in second exhibit 466*b* may decrease. In such case, second annotation 464*b* may be minimized or may be trimmed to provide less information, such as simply indicating "TIGER." Meanwhile, third annotation 464*c* rendered adjacent third exhibit 466*c* may be expanded to contain more information about the Eiffel Tower and/or architecture generally. While graphical user interface 460 is a "ROBOT'S EYE VIEW," a user could just as easily operate a graphical user interface that is a "BIRD'S EYE VIEW" to navigate a robot through a museum and see the same or similar annotations.

As noted previously, in some implementations, annotations may be rendered to be operable or "actionable." For example, an annotation rendered in association with a museum exhibit may be operated by the user to bookmark the exhibit. The user may later select the bookmark, and the exhibit may be automatically re-annotated. In some implementations, selecting the bookmark may cause the user's robot, or a robot operated by another user, to automatically navigate to the exhibit. In some implementations, selecting the annotation may additionally or alternatively cause the robot to take a picture of the exhibit, and/or to download a high quality photo of the exhibit (or to determine a URL of such a photo) for sharing with friends.

As another example, clicking on an annotated rendered in association with a door may cause the robot to open the door (or, if the door is capable, to automatically open the door). As another example, clicking on an annotation rendered in association with an elevator door may call the elevator. As another example, clicking on an annotation rendered in association with a display may project or "cast" contents of someone's mobile device screen onto the display. As yet another example, clicking on an annotation rendered in association with a printer may make the printer the default printer for the operator's robot.

As noted above, visual annotations may be provided for entities that are not necessarily in the robot's field or view or even immediately proximate to the robot. For example, in FIG. 4, a fourth visual annotation 464*d* in the form of an arrow is rendered to indicate a direction in which more entities are located. In this instance, because a record of interactions between the controlling user and one or more computing devices (e.g., the user's context maintained by user context engine 154) indicates that the user has potential interest in mammals, the arrow is pointed towards more mammal-related exhibits. However, if the record of interactions indicated that the user had other interests, e.g., in addition to or instead of mammals, one or more other arrows may be rendered pointing to other exhibits of potentially high interest to the user. Or, if the controlling user misplaced her keys or smart phone in the museum, an arrow may be rendered in graphical user interface 460 to show they keys' or phone's location.

Figure 5:
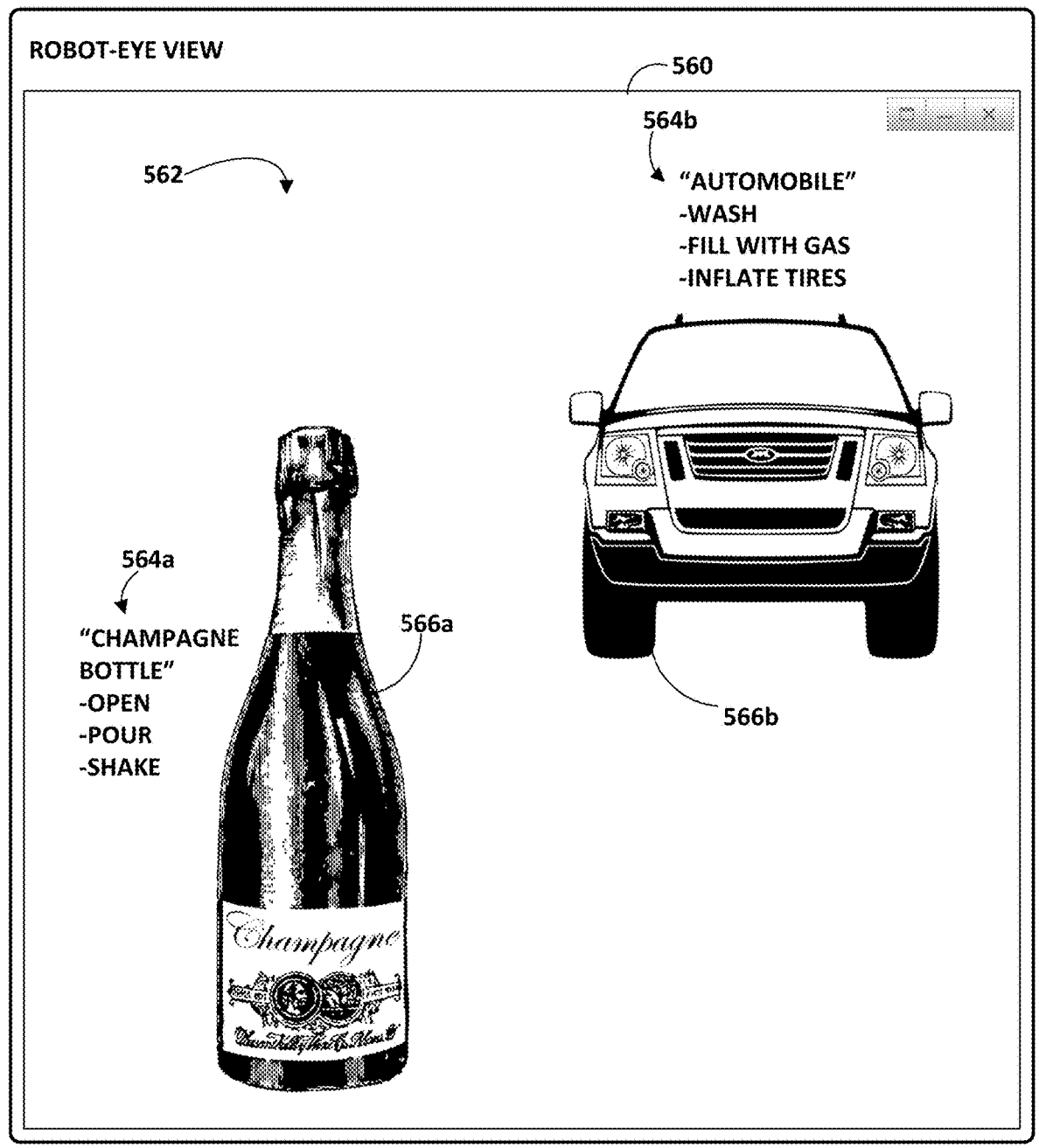

FIG. 5 depicts yet another "ROBOT-EYE VIEW" graphical user interface 560 that a user may operate to remotely control a robot (not depicted in FIG. 5). In this example, the user may be remotely controlling a robot equipped with one or more end effectors (e.g., 106 in FIG. 1) that it may use to perform a variety of tasks. Rendered in graphical user interface 560 is a representation 562 of a video feed captured by one or more cameras of the robot. In this example, a first entity the robot "sees" is a champagne bottle 566*a*, and a second entity the robot "sees" is an automobile 566*b*. The robot may identify these entities, or may provide a signal to another computing device to identify these entities, based on a variety of attributes of the entities that match attributes of records of known objects stored in index 159 by object attribute engine 158.

Various visual annotations may be rendered within representation 562 based on the identities of these entities. For example, a first visual annotation 564*a* is rendered adjacent bottle 566*a*, and includes an identity of the entity "CHAMPAGNE BOTTLE" and a list of tasks that the robot may perform on the bottle, including OPEN, POUR, and SHAKE. These tasks may be stored in index 159 via object attribute engine 158 in response to direct user programming and/or in response to past robot interactions with similar objects. For example, a previous user may have manually operated a robot in a "TEACHING" mode to use its end effector (e.g., claw) to pick up and pour liquid from a similar bottle, all while recording sensor data from that robot. The previous user may have stored that sensor data as a task in index 159. The same task may then be available for performance by other robots with the same or similar end effector when they encounters similar objects (e.g., bottles). Another visual annotation 564*b* is rendered adjacent automobile 566*b*, and includes tasks such as WASH, FILL WITH GAS, and INFLATE TIRES.

Visual annotations may be selectively rendered based on a variety of other attributes of a context of a user controlling a robot such as a telepresence robot. For example, a user's title and/or membership in a group may impact what visual annotations are presented to the user. A member of the building maintenance team may have a relatively high measure of potential interest in, and therefore might be presented with visual annotations pertaining to, objects such as smoke alarms, sprinklers, electrical lines, etc., as he or she remotely navigates a telepresence robot through a building. Another user not involved with maintenance and/or safety may be presented with entirely different visual annotations as the second user remotely navigates a telepresence robot through the same building.

Suppose a member of the security team remotely navigates a telepresence robot through the same building. The security team member may be presented with visual annotations of entities that pertain to security (e.g., because a measure of his or her potential interest in such entities may be relatively high), such as visual annotations that passerby's are authorized or not authorized to be in areas in which they are encountered by the robot, or that doors or windows are in locked or unlocked states. Additionally or alternatively, whole areas of the building could be annotated, e.g., with a particular hue, to indicate a level of security clearance required to be permitted to be in those locations. Passerby's encountered by the robot may be similarly annotated to the member of the security team, e.g., in a similar hue, so that the member of the security team may readily discern whether a passerby is in an authorized location.

In some implementations, entities encountered by a robot (e.g., 100, 300) may be visually annotated in a graphical user interface in response to a determination by the robot that the entity poses a collision risk. This may occur even where the robot is unable to identify the entity. Suppose a robot is traveling along a predetermined path (e.g., in response to a user tapping a rendered visual annotation on her touchscreen) when a person unknown to the controlling user unexpectedly walks into the path. The stranger may be annotated as a collision risk, e.g., with flashing or other conspicuous annotation. In some implementations, the robot may be configured to automatically avoid such obstacles, e.g., by stopping immediately. However, visually annotating such obstacles may provide the controlling user an opportunity to take more desirable remedial action, such as traveling around the obstacle. In various implementations, if additional information about an entity that poses a collision risk may be determined from user context engine 154 (e.g., that a passerby in the robot's path is disabled and thus likely will not be able to avoid the collision), the entity may be visually annotated with this additional detail.

Figure 6:
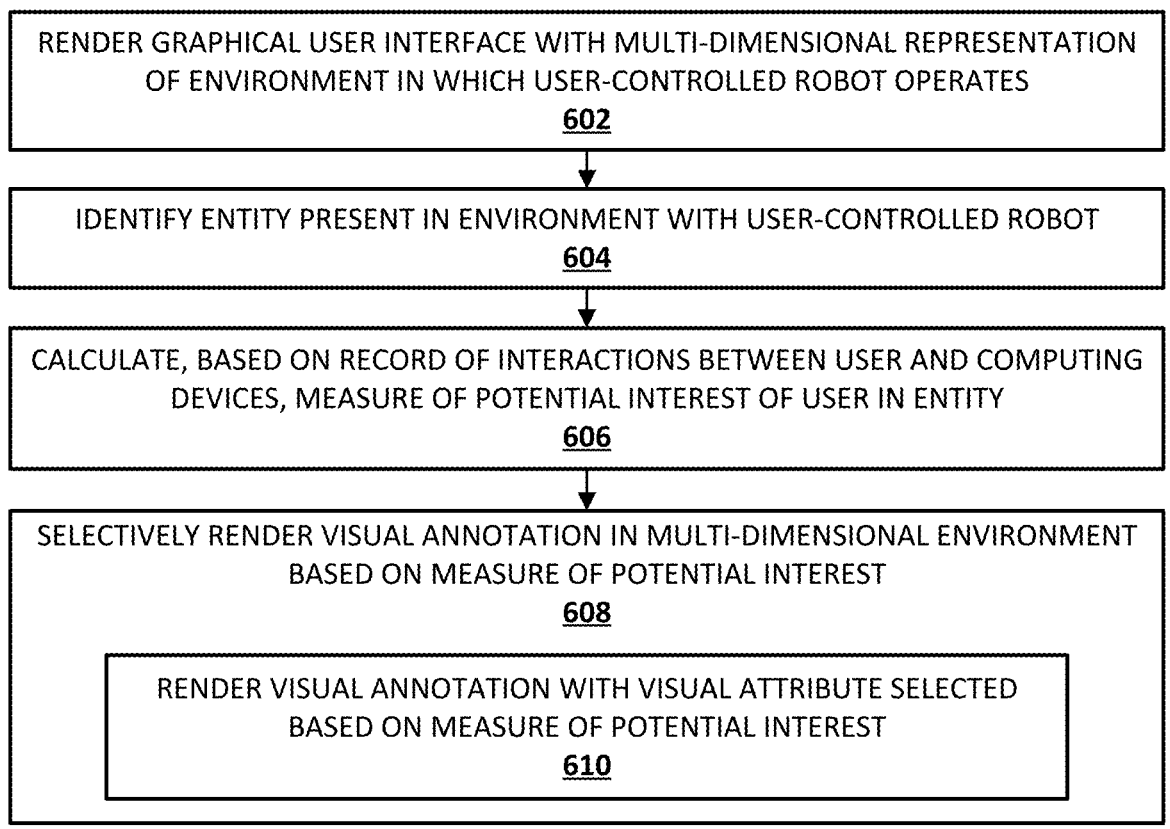
FIG. 6 depicts an example method for providing a graphical user interface that includes annotations of object states and transitions, in accordance with various implementations.

Referring now to FIG. 6, an example method 600 of selectively visually annotating a multi-dimensional representation (e.g., 104) of a robotic environment is described. For convenience, the operations of flow charts are described with reference to a system that performs the operations. This system may include various components of various computer systems, including computing elements of robot 100 and/or control system 150. Moreover, while operations of method 600 are shown in a particular order, this is not meant to be limiting. One or more operations may be reordered, omitted or added.

At block 602, the system may render a graphical user interface (e.g., 160, 260, 360, 460, 560) with a multi-dimensional representation of an environment in which a robot remotely controlled by a user operates. Examples of such a multi-dimensional representation are indicated at 262, 362, 462, and 562 in FIGS. 2-5. In some implementations, such as where the multi-dimensional representation is a map view as depicted in FIG. 3, the multi-dimensional representation may be partially or entirely computer-generated. In other implementations, the multidimensional representation may be rendered based on data received via a video feed of an actual robotic environment, or from a camera mounted on a robot (e.g., as shown in FIGS. 2 and 4). In such implementations, visual annotations (discussed in more detail above and below) may be overlaid on top of the video feed to achieve what is often referred to as "augmented reality."

At block 604, the system may identify an entity that is present in the environment with the user-controlled robot. As noted above, an entity may be a person or an object. An object may be something that the robot can act upon (e.g., a cup, ball, machine part, etc.) or an object that may be "consumed" by the user controlling the robot, such as the museum exhibits 366a-c depicted in FIG. 3. An entity may be identified in various ways based on various signals. For example facial recognition may be used, e.g., by the robot itself or by another computing device that analyzes a signal provided by the robot, to identify a person. Additionally or alternatively, the robot may monitor for signals from one or more communication mechanisms associated with an entity, such as an RFID tag affixed to or near an object (e.g., a museum exhibit), a computing device (e.g., smart phone, tablet, smart watch, etc.) carried by a person, an RFID badge worn by a person, and so forth. Additionally or alternatively, an entity may be identified (e.g., with varying levels of confidence) based on a record (e.g., maintained by user context engine 154 in index 155) of one or more interactions between the user and the one or more computing devices. For example, if Ted and Pam exchanged texts about meeting at a particular location at a particular time, and Ted's robot encounters one person at the location at the scheduled time, Ted's robot may presume that the person is Pam.

At block 606, the system may calculate a measure of potential interest of the user in an entity encountered by a robot controlled by the user. A measure of potential interest may be a number within a range, a binary, or any other type of measure that may be used to determine whether and/or how to render a visual annotation associated with the entity. As described previously, the measure of potential interest may be calculated based on a record of one or more interactions between a user and one or more computing devices.

In some implementations, the record of interactions considered when calculating a measure of potential user interest in an entity may include interactions between the user and computing devices for purposes other than directly operating the robot, including but not limited to user content, communications, social networking activity of the user (e.g., friends, acquaintances, networks, status updates, etc.), electronic calendar entries, tasks, reminders, operating devices other than the robot (e.g., a printer), and so forth. In other implementations, the record of interactions considered when calculating the measure of potential user interest in an entity may include interactions between the user and computing devices for purposes of directly operating the robot. For example, the fact that a user frequently has operated a robot to follow a particular path, or to follow a particular person, or to perform a particular task—any such interactions for purposes of directly operating a robot may be considered to calculate a measure of potential user interest. In yet other implementations, both interactions for purposes other than direct operation of the robot and interactions for purposes of directly operating the robot may be considered.

At block 608, the system may selectively render, e.g., in the multi-dimensional representation rendered at block 602, based on the measure of potential user interest calculated at block 606, a visual annotation adjacent and/or overlaying the entity. Numerous examples of such annotations are depicted in FIGS. 2-5. Another example would be to annotate (e.g., highlight, render path to, etc.) a printer to which the user sent a print job, e.g., so that the user may operate a robot to retrieve the printed document from the printer. Yet another example would be to annotate (e.g., highlight) a display device that is being used in a meeting room to stage a presentation prepared by the user (e.g., through a telepresence robot in the meeting room on the user's behalf). Yet another example would be to annotate a robot's current trajectory, e.g., based on current wheel orientation. Yet another example would be to annotate how a robot manipulates a plurality of object. For example, a volume of a current workspace may be calculated based on current robot location and arm position, and annotated accordingly.

In some implementations, one or more visual attributes to be applied to a visual annotation may be selected at block 610 based on the measure of potential user interest. Such visual attributes may include but are not limited to color (hue), brightness, opacity, animation, text font, text shape, text size, and so forth.

In various implementations, entities such as objects (e.g., office equipment, furniture, exhibits) in an environment may be inventoried in various ways. For example, one or more autonomous or semi-autonomous robots may roam a building to build an inventory of object locations through camera and/or object recognition. In some implementations, sensors associated with the environment, such as security cameras, may additionally or alternatively be used to contribute to the inventory. Other devices passing by an object (e.g., a person's smart phone) could also be used to contribute to the inventory.

While examples described herein have tended to relate to corporate environments, this is not meant to be limiting. Techniques described herein may be used in other environments as well. For example, people who are away from home may navigate robots such as telepresence robots through their homes, e.g., to check up on their kids, pets, etc. The techniques could also be employed by a remote cleaning crew operating one or more cleaning robots, e.g., to annotate objects that should be avoided, objects that should be cleaned, and so forth. The techniques could also be used by a remote care giver (e.g., a medical professional such as a doctor or nurse) to view annotations associated with patients, etc.

In some implementations, in addition to or instead of a single robot, multiple, separate devices such as sensors that move independently of each other and/or that are in fixed locations (e.g., wall mounted cameras) may provide video feeds (e.g., composite video feeds), and these feeds may be annotated as described herein. In some implementations, multiple robots may cooperate to perform a single task. For example, a telepresence robot could be assisted by a robot with a tray that can be used to carry items (e.g., drinks) and follow the telepresence robot. In such implementations, video feeds from one or both robots may be annotated using techniques described herein, and/or a bird's eye view showing both robots may also be annotated using techniques described herein.

Figure 7:
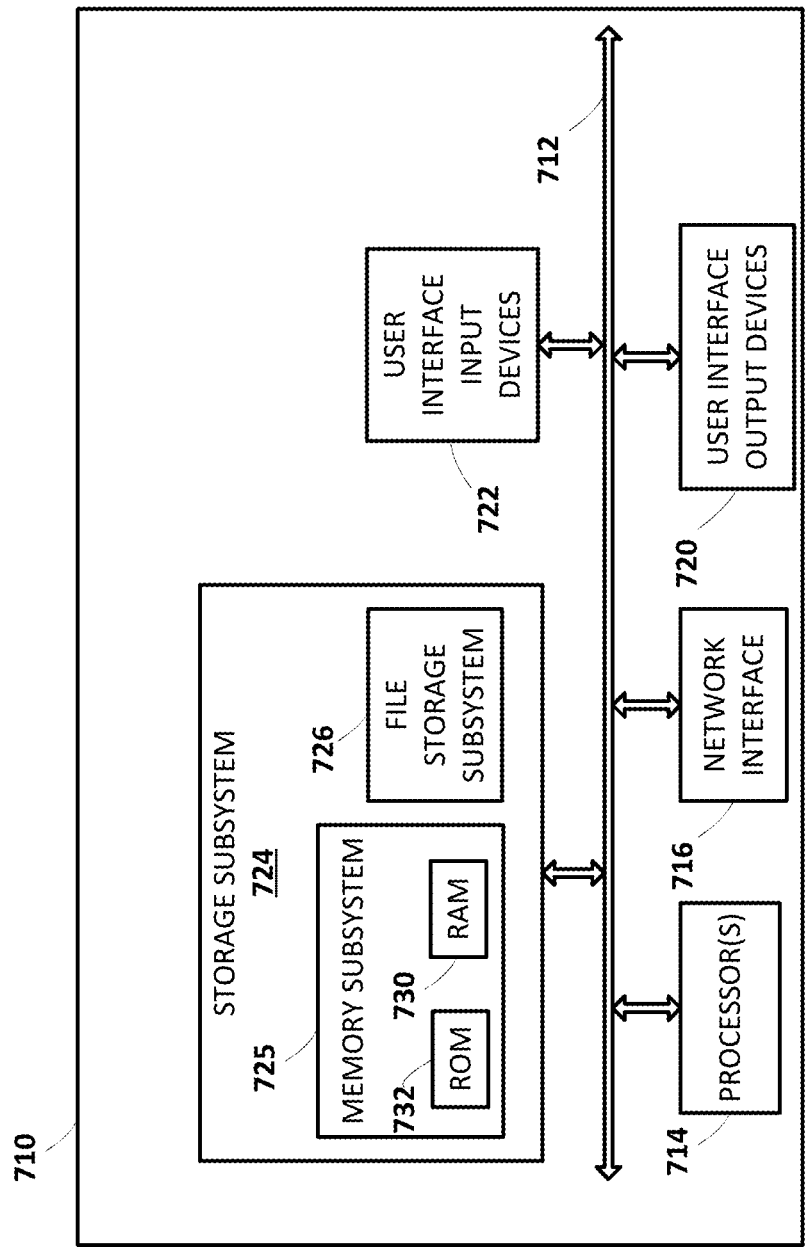
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of method 600, and/or to implement one or more aspects of logic 102, user interface engine 152, user context engine 154, user interest engine 156, and/or object attribute engine 158. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a CD-ROM drive, an optical drive, or removable media cartridges. Modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

Figure 8:
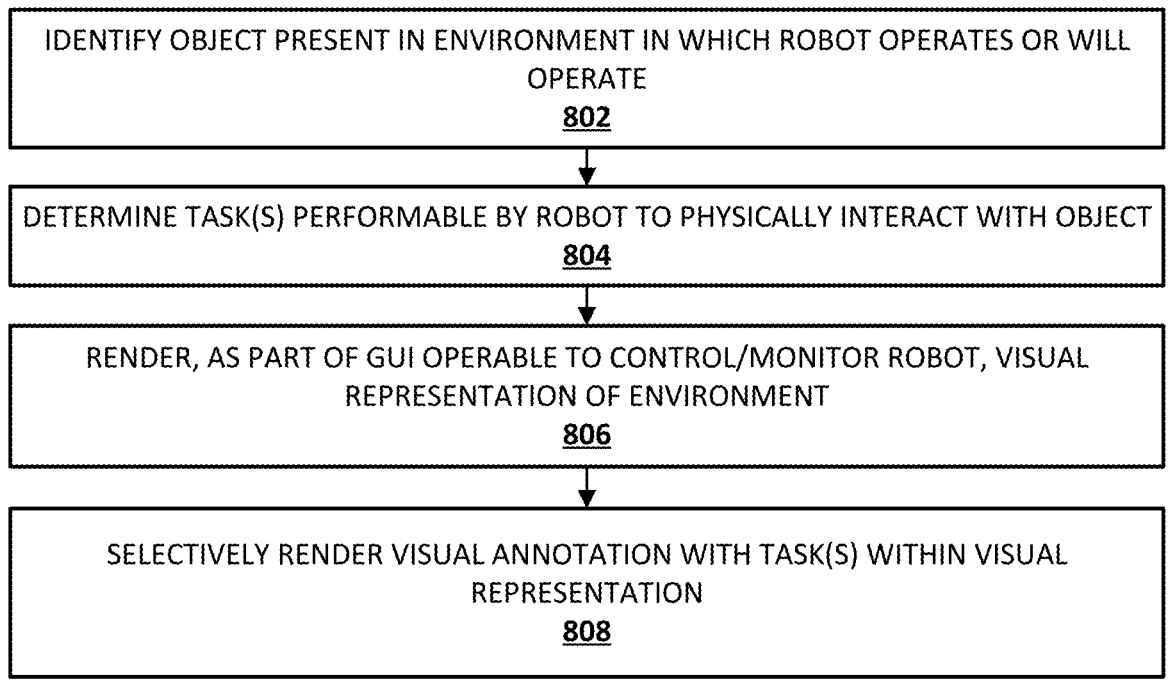
FIG. 8 depicts an example method for practicing selected aspect of the present disclosure, in accordance with various implementations.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure Referring now to FIG. 8, an example method 800 for performing selected aspects of the present disclosure is described. For convenience, the operations of flow charts are described with reference to a system that performs the operations. This system may include various components of various computer systems, including computing elements of robot 100 and/or control system 150. Moreover, while operations of method 800 are shown in a particular order, this is not meant to be limiting. One or more operations may be reordered, omitted or added.

At block 802, the system may identify an object that is present in an environment in which a robot operates or will operate. At block 804, the system may determine one or more tasks that are performable by the robot to physically interact with the object using one or more end effectors of the robot. At block 806, the system may render, as part of a graphical user interface operable by an individual to control or monitor the robot, a visual representation of the environment. At block 808, the system may selectively render a visual annotation with the one or more tasks within the visual representation of the environment. In various implementations, the object may be a vehicle, such as automobile 566b in FIG. 5, and the one or more tasks may include filling the vehicle with gas, inflating one or more tires of the vehicle, and/or washing the vehicle, as depicted in FIG. 5.

Referring now to FIG. 9, an example method 900 of selectively visually annotating a multi-dimensional representation (e.g., 104) of a robotic environment is described. For convenience, the operations of flow charts are described with reference to a system that performs the operations. This system may include various components of various computer systems, including computing elements of robot 100 and/or control system 150. Moreover, while operations of method 900 are shown in a particular order, this is not meant to be limiting. One or more operations may be reordered, omitted or added.

At block 902, the system may identify a first person that is present in an environment in which a robot operates or will operate. At block 904, the system may determine, from a calendar or electronic correspondence sent or received by a second person that controls or monitors the robot, one or more pieces of information that relate the first person to the second person. As noted previously, in some implementations, the calendar and electronic correspondence may be stored in index 155. At block 906, the system may render, as part of a graphical user interface operable by the second person to control or monitor the robot, a visual representation of the environment. At block 908, the system may selectively render a visual annotation with the one or more pieces of information that relate the first person with the second person within the visual representation of the environment.

What is claimed is:

1. A method implemented by one or more processors, comprising:
    identifying a first person that is present in an environment in which a robot operates or will operate;
    determining, from a calendar or electronic correspondence sent or received by a second person that controls or monitors the robot, one or more pieces of information that relate the first person to the second person;
    rendering, as part of a graphical user interface operable by the second person to control or monitor the robot, a visual representation of the environment; and
    selectively rendering a visual annotation with the one or more pieces of information that relate the first person with the second person within the visual representation of the environment.

2. The method of claim 1, wherein the identifying is based on data captured by one or more vision sensors integral with the robot.

3. The method of claim 1, wherein the visual annotation is selectable by the second person to cause the robot to perform one or more tasks.

4. The method of claim 1, wherein the visual representation of the environment comprises a live video feed provided by the robot, and wherein selectively rendering the visual annotation comprises overlaying the visual annotation on the live video feed.

5. The method of claim 1, wherein the visual representation of the environment comprises a live map view of the environment, and wherein selectively rendering the visual annotation comprises overlaying the visual annotation on the live map view.

6. The method of claim 1, wherein the visual annotation conveys a scheduled meeting that includes the first person and the second person.

7. The method of claim 1, wherein the visual annotation conveys information about an email exchange between the first person and the second person.

8. At least one non-transitory computer-readable medium comprising instructions that, in response to execution of the instructions by one or more processors, cause the one or more processors to perform the following operations:
    identifying a first person that is present in an environment in which a robot operates or will operate;
    determining, from a calendar or electronic correspondence sent or received by a second person that controls or monitors the robot, one or more pieces of information that relate the first person to the second person;
    rendering, as part of a graphical user interface operable by the second person to control or monitor the robot, a visual representation of the environment; and
    selectively rendering a visual annotation with the one or more pieces of information that relate the first person with the second person within the visual representation of the environment.

9. The at least one non-transitory computer-readable medium of claim 8, wherein the identifying is based on data captured by one or more vision sensors integral with the robot.

10. The at least one non-transitory computer-readable medium of claim 8, wherein the visual annotation is selectable by the second person to cause the robot to perform one or more tasks.

11. The at least one non-transitory computer-readable medium of claim 8, wherein the visual representation of the environment comprises a live video feed provided by the robot, and wherein selectively rendering the visual annotation comprises overlaying the visual annotation on the live video feed.

12. The at least one non-transitory computer-readable medium of claim 8, wherein the visual representation of the environment comprises a live map view of the environment, and wherein selectively rendering the visual annotation comprises overlaying the visual annotation on the live map view.

13. The at least one non-transitory computer-readable medium of claim 8, wherein the visual annotation conveys a scheduled meeting that includes the first person and the second person.

14. A system comprising one or more processors and memory storing instructions that, in response to execution of the instructions by the one or more processors, cause the one or more processors to:
- identify a first person that is present in an environment in which a robot operates or will operate;
- determine, from a calendar or electronic correspondence sent or received by a second person that controls or monitors the robot, one or more pieces of information that relate the first person to the second person;
- render, as part of a graphical user interface operable by the second person to control or monitor the robot, a visual representation of the environment; and
- selectively render a visual annotation with the one or more pieces of information that relate the first person with the second person within the visual representation of the environment.

15. The system of claim 14, wherein the identification is based on data captured by one or more vision sensors integral with the robot.

16. The system of claim 14, wherein the visual annotation is selectable by the second person to cause the robot to perform one or more tasks.

17. The system of claim 14, wherein the visual representation of the environment comprises a live video feed provided by the robot, and wherein selectively rendering the visual annotation comprises overlaying the visual annotation on the live video feed.

18. The system of claim 14, wherein the visual representation of the environment comprises a live map view of the environment, and wherein the selectively rendering the visual annotation comprises overlaying the visual annotation on the live map view.

19. The system of claim 14, wherein the visual annotation conveys a scheduled meeting that includes the first person and the second person.

20. The system of claim 14, wherein the visual annotation conveys information about an email exchange between the first person and the second person.

* * * * *